United States Patent
Brockett et al.

(10) Patent No.: US 7,752,034 B2
(45) Date of Patent: Jul. 6, 2010

(54) WRITING ASSISTANCE USING MACHINE TRANSLATION TECHNIQUES

(75) Inventors: Christopher Brockett, Bellevue, WA (US); William Dolan, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 617 days.

(21) Appl. No.: 11/246,979

(22) Filed: Oct. 7, 2005

(65) Prior Publication Data

US 2006/0053001 A1    Mar. 9, 2006

(51) Int. Cl.
G06F 17/27    (2006.01)
G06F 17/28    (2006.01)

(52) U.S. Cl. .................. 704/9; 704/2; 704/4

(58) Field of Classification Search ............... 704/1–10
See application file for complete search history.

(56) References Cited

U.S. PATENT DOCUMENTS

| | | | |
|---|---|---|---|
| 5,386,556 A | 1/1995 | Hedin et al. ............ 395/600 |
| 5,495,413 A | 2/1996 | Kutsumi et al. ............ 704/4 |
| 5,870,700 A | 2/1999 | Parra | |
| 5,960,080 A * | 9/1999 | Fahlman et al. .......... 380/252 |
| 5,995,920 A | 11/1999 | Carbonell et al. | |
| 5,999,896 A * | 12/1999 | Richardson et al. .......... 704/9 |
| 6,035,269 A * | 3/2000 | Kim .................. 704/9 |
| 6,098,033 A | 8/2000 | Richardson et al. .......... 704/1 |
| 6,188,976 B1 | 2/2001 | Ramaswamy et al. ........ 704/9 |
| 6,424,983 B1 | 7/2002 | Schabes et al. | |
| 6,848,080 B1 | 1/2005 | Lee et al. | |
| 6,871,174 B1 | 3/2005 | Dolan et al. ............ 704/9 |
| 6,961,692 B1 * | 11/2005 | Polanyi et al. ............ 704/9 |
| 7,013,264 B2 | 3/2006 | Dolan et al. ............ 704/9 |
| 7,031,911 B2 * | 4/2006 | Zhou et al. ............ 704/10 |
| 7,043,420 B2 | 5/2006 | Ratnaparkhi ............ 704/9 |
| 7,050,964 B2 | 5/2006 | Menzes et al. ............ 704/2 |
| 7,107,204 B1 * | 9/2006 | Liu et al. ............ 704/2 |
| 7,146,308 B2 | 12/2006 | Lin et al. ............ 704/9 |
| 7,243,305 B2 | 7/2007 | Schabes et al. | |
| 7,412,385 B2 | 8/2008 | Brockett et al. ........... 704/245 |
| 2001/0056352 A1 * | 12/2001 | Xun .................. 704/277 |
| 2003/0011642 A1 * | 1/2003 | Sheng ............... 345/810 |
| 2003/0033279 A1 | 2/2003 | Gibson et al. .......... 707/1 |
| 2003/0055625 A1 | 3/2003 | Korelsky et al. ......... 704/9 |
| 2004/0181410 A1 | 9/2004 | Hwang ............... 704/256 |
| 2006/0015324 A1 | 1/2006 | Pan et al. ............ 704/9 |
| 2006/0053001 A1 | 3/2006 | Brockett et al. ........ 704/9 |

(Continued)

FOREIGN PATENT DOCUMENTS

EP    1531402 A2    5/2005

OTHER PUBLICATIONS

Liu et al. "PENS: a machine-aided English writing system", Proc. of the 38th Annual Meeting on Association for Computational Linguistics, Oct. 2000.*

(Continued)

Primary Examiner—Richemond Dorvil
Assistant Examiner—Jialong He
(74) Attorney, Agent, or Firm—Westman, Champlin & Kelly, P.A.

(57) ABSTRACT

A system is configured to provide writing assistance within a monolingual input environment based on statistical machine translation techniques typically utilized to translate from an input language to a different target language.

18 Claims, 5 Drawing Sheets

U.S. PATENT DOCUMENTS

2007/0073532 A1    3/2007    Brockett et al. ................ 704/9

OTHER PUBLICATIONS

MSWord_XP_2001.PDF, a screen shot of Microsoft Word XP build-in synonym looking-up function, MS Word XP published in 2001.*
The Writing Turbocharger—a tutorial for Microsoft Word 97, [online], pubished 1999. [retrieved on Oct. 20, 2000], retrieved from: "http://ec.hku.hk/writing%5Fturbocharger/default.asp".*
MacDonald "The writer's workbench: computer aids for text analysis", IEEE Trans. on Communications, Jan. 1982.*
Heidorn, "Intelligent writing assistance", Handbook of Natural Language Processing, CRC press, 2000.*
Ibrahim et al. "Extracting structural paraphrases from aligned monolingual corpora", Proceedings of the Second International Workshop on Paraphrasing, Jul. 2003.*
C. Quirk et al.; "Dependency Treelet Translation: Syntactically Informed Phrasal SMT," *Proceedings of the 43rd Annual Meeting of the ACL*, Association for Computer Linguistics, Ann Arbor, Jun. 2005, pp. 271-279.
Quirk, C.; Brockett C.; & Dolan, W.; "Monolingual Machine Translation for Paraphrase Generation," *Proceedings of the 2004 Conference on Empirical Methods in Natural Language Processing*, Jul. 2004, Barcelona Spain, pp. 142-149.
Ringger & Allen, Eric K. & James F.; "A Fertility Channel Model for Post-Correction of Continuous Speech Recognition," Proc. of the 4th International Conference on Spoken Language Processing (ICSLP'96), Philadelphia, PA. Oct. 1996, pp. 1-4.
P. Brown et al.; "The Mathematics of Statistical Machine Translation: Parameter Estimation, Computational Linguistics," *Computational Linguistics*, vol. 19, No. 2, Jun. 1993, pp. 263-311.
Kang, B.J. & Choi, K.S.; "Automatic Transliteration and Back-Transliteration by Decision Tree Learning," *Proceedings of 2nd* International Conference on Language Resources and Evaluation, Athens, Greece May-Jun. 2000, pp. 1135-1141.
Shinyama, Y.; Satoshi, S.; & Sudo, K.; "Automatic Paraphrase Acquisition from News Articles," Dept. of Computer Science, NY University, Proceedings of Human Language Technology Conference 2002, pp. 40-46.
Pang, B.; Knight, K.; & Marcu, D.; "Syntax-based Alignment of Multiple Translations : Extracting Paraphrases and Generating New Sentences," Proc. of HLT/NAACL, 2003, 8 pages.
K.S. Jeong et al.; "Automatic Identification and Back-Transliteration of Foreign Words for Information Retrieval," *Information Processing and Management*: An International Journal, Oxford, NY, Pergamon Press. 1999, pp. 523-540.
Lin, D. & Pantel, P.; "DIRT-Discovery of Inference Rules from Text," ACM SIGKDD Conference on Knowledge Discovery and Data Mining, 2001, 6 pages.
Dolan, W.; Quirk, C.; & Brockett, C.; "Unsupervised Construction of Large Paraphrase Corpora : Exploiting Massively Parallel News Source," *Proceedings of COLING* 2004, Geneva Switzerland, pp. 1-7.
Related U.S. Appl. No. 10/706,102, filed Nov. 12, 2003.
Knight, K. & Graehl, J.; "Machine Transliteration," Proc. of the 35th Annual Meeting of the Association for Computational Linguistics, 1997. pp. 128-135.
Wang, Y.Y. & Waibel, A.; "Decoding Algorithm in Statistical Machine Translation," Proc. of 35th Annual Meeting of the Association of Computational Linguistics, 1997, 7 pgs.
Al-Onaizan, Y. & Knight, K.; "Machine Transliteration of Names in Arabic Text," Proc. of ACL Workshop on Computational Approaches to Semitic Languages, 2002, 12 pages.
Brill, E.; Kacmarcik, G.; & Brockett, C.; "Automatically Harvesting *Katakana*-English Term Pairs from Search Engine Query Logs," NLPRS 2001 : pp. 393-399.
Kang, B.J. & Choi, K.S.; "English-Korean Automatic Transliteration/Back-transliteration System and Character Alignment," The 38th Annual Meeting of the Association for Computational Linguistics, Oct. 2000, 2 pgs.
Al-Onaizan, Y. & Knight, K.; "Translating Named Entities Using Monolingual and Bilingual Resources," Proc. of the 40th Annual Meeting of the Assoc. for Computational Linguistics, Philadelphia, PA, Jul. 2002, pp. 400-408.
Barzilay, R. & McKeown, K.; "Extracting Paraphrase From a Parallel Corpus," ACL, 2001, Computer Science Dept., Columbia University, New York, NY, 8 pages.
Barzilay, R. & Lee, L.; "Learning to Paraphrase: An Unsupervised Approach Using Multiple-Sequence Alignment," Proc. of HLT-NAACL 2003, Edmonton, May-Jun. 2003, pp. 16-23.
Virga, P. & Khudanpur, S.; "Transliteration of Proper Names in Cross-Lingual Information Retrieval," Proc. of the ACL Workshop on Multilingual Named Entity Recognition, 2003, 8 pgs.
Glover-Stalls, B. & Knight, K.; "Translating Names and Technical Terms in Arabic Text," Proceedings of the COLING/ACL Workshop on Computational Linguistics, 1998, 8 pgs.
A. Ibrahim. "Extracting Paraphrases from Aligned Corpora," MIT Research Paper, Sep. 2002, pp. 1-60.
D. Yarowsky. Word-Sense Disambiguation Using Statistical Models of Roget's Categories Trained on Large Corpora, Proceedings of Coling-92, Jul. 1992. pp. 454-460.
Goldman, N. M. 1975. Sentence paraphrasing from a conceptual base. Commun. ACM 18, 2 (Feb. 1975), 96-106.
Riesbeck et al., C.K. 1975. Inference and Paraphrase by Computer. J. AMC 22, 3 (Jul. 1975).
Farhat et al., A.; "Clustering Words for Statistical Language Models Based on Contextual Word Similarity," INRS-Telecommunications, IEEE, pp. 180-183, 1996.
Japanese Pat. Appln. # 2004-316990 First Official Action of Rejection, Oct. 2007.
Covington, Michael. "An Algorithm to Align Words for Historical Comparison" 1996 Association for Computational Linguistics. vol. 22, No. 4. pp. 481-496.
Iyer et al., R.; "Using out-of-domain data to improve in-domain language models," Signal Processing Letters, IEEE, vol. 4, No. 8, 221-223, Aug. 1997.
Machine Translation. (Oct. 21, 2007) In Wikipedia, The Free Encyclopedia. Retrieve 16:08, Oct. 25, 2007, from http://wikipedia.org/w/index.php?title= translation&oldid=166117463.
Onifer, W., & Swinney, D. (1981). Accessing lexical ambiguities during sentence comprehension: Effects of frequency, meaning and contextual bias. Memory & Cognition, 9 225-236.
Hayes-Roth & Mostow, F. and D.; "Syntax and Semantics in a Distributed Speech Understanding System," IEEE—Downloaded Oct. 24, 2008—Computer Science Dept. Carnegie-Mellon University, pp. 421-424.
Nie, J., Simard, M., Isabelle, P. And Durand, R. 1999. Cross-language information retrieval based on parallel texts and automatic mining of parallel texts from the web. In Proceedings of the 22nd Annual International ACM SIGIR Conference on Research and Development in Information Retrieval (Berkeley, CA, U.S.) Aug. 15-19, 1999.

* cited by examiner

WRITING ASSISTANCE USING MACHINE TRANSLATION TECHNIQUES

The present invention is related to and claims priority of co-pending U.S. patent application Ser. No. 11/238,335, filed Sept. 29, 2005, entitled "WRITING ASSISTANCE USING MACHINE TRANSLATION TECHNIQUES", and is related to and claims priority of co-pending U.S. patent application Ser. No. 10/989,076, filed Nov. 15, 2004; and is also related to and claims priority of co-pending U.S. patent application Ser. No. 10/706,102, which was filed Nov. 12, 2003.

BACKGROUND

A significant challenge faced by developers of grammar and style checking systems lies in providing an ability to generate well-formed replacements or replacement candidates that will not irritate a user by being invalid or unmotivated. Developers of other forms of automated editorial assistance and proofing tools are confronted with similar issues.

The challenge is further compounded when there is a desire to extend a system's support capability to effectively account for input by users that write in a language other than their native language. Such users often present error types that differ significantly from both native speakers writing in their own language and native speakers of other languages. It is generally difficult to provide editorial assistance or proofing functionality for both native and non-native speakers within the framework of a single application.

To the extent that current systems are configured to provide substitutions for text that is somehow deficient, most replacements are limited to simple, easy-to-predict circumstances. Many substitutions relate to a simple re-ordering of clauses. Other replacements involve a replacement of one or two words, and this usually in the context of spelling errors or a proposed substitution for an easily confused term. For many types of stylistic infelicity or errors of coherence, most systems are incapable of providing guidance beyond suggesting that a problematic section of prose be rewritten.

Further, it is common for known systems to be relatively expensive to develop and maintain. Many systems require significant language-specific manual intervention (i.e., rule writing) on the part of a developer. Also, many systems are relatively inflexible in terms of their ability to change or alter editing support.

The discussion above is merely provided for general background information and is not intended for use as an aid in determining the scope of the claimed subject matter. Further, it should also be emphasized that the claimed subject matter is not limited to implementations that solve any or all of the disadvantages of any currently known systems noted in this section.

SUMMARY

A system is configured to provide writing assistance within a generally monolingual input environment based on statistical machine translation techniques typically utilized to translate from an input language to a different target language.

This Summary is provided to introduce concepts in a simplified form that are further described below in the Detailed Description. This Summary is not intended to identify key features or essential features of the claimed subject matter, nor is it intended for use as an aid in determining the scope of the claimed subject matter.

DETAILED DESCRIPTION

Figure 1:
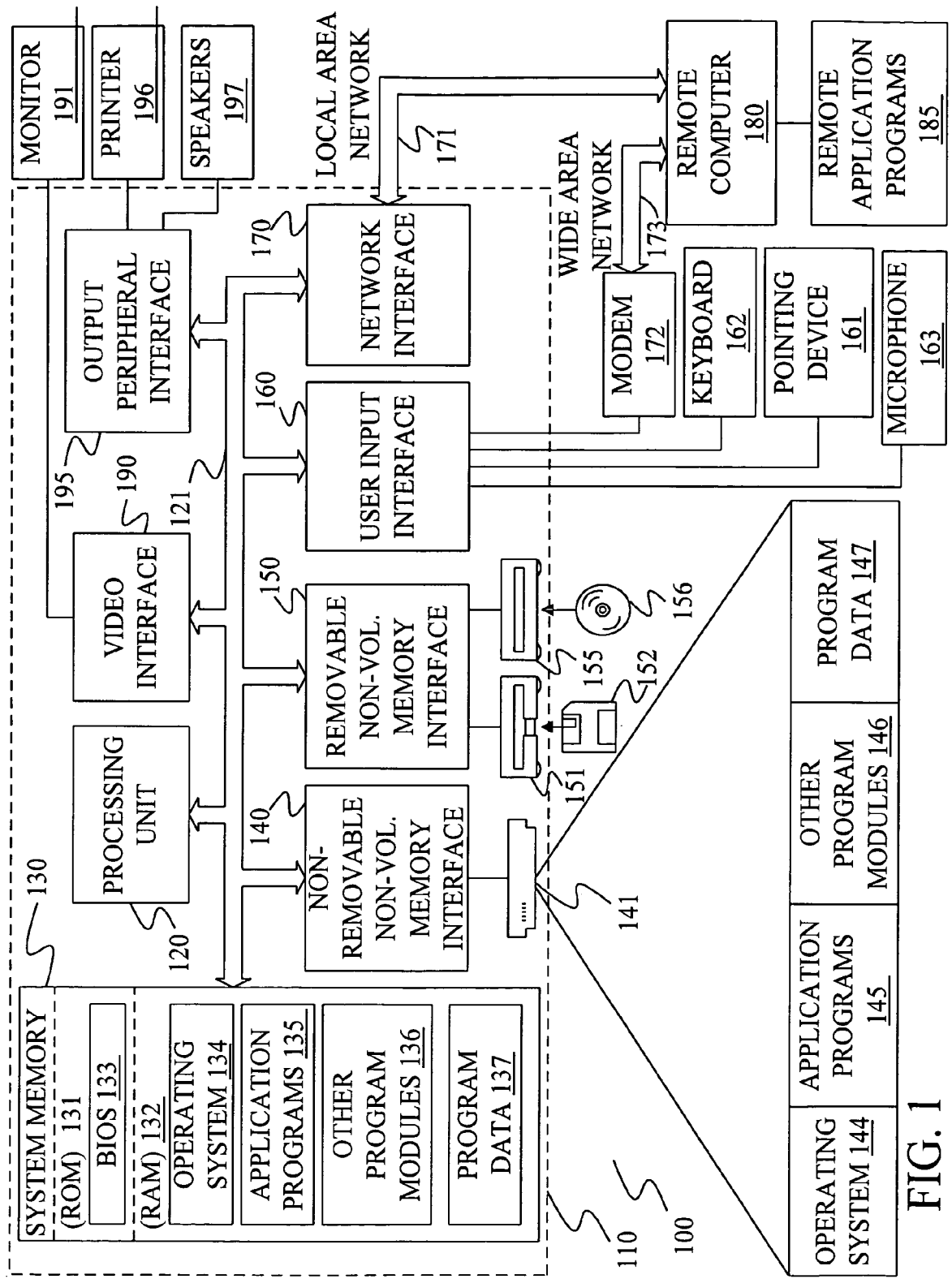
FIG. 1 is a block diagram of one computing environment in which some embodiments may be practiced.

FIG. 1 illustrates an example of a suitable computing system environment 100 in which embodiments may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing some embodiments includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

A writing assistance system is illustratively configured to provide writing or editorial assistance within a generally monolingual input environment based on statistical machine translation techniques typically utilized to translate from an input language to a different target language. Support for such a system derives from the fact that there are significant underlying functional similarities between certain machine translation techniques and processes that can be applied to identify when an editorial change may be desirable for the sake of modifying grammar or style.

Following is a list of example situations, not by limitation, in which the described writing assistance system can be applied to support an editorial changed based on a grammatical or stylistic motivation.

Reordering
   I wanted to quickly finish->I wanted to finish quickly
   Changes to remedy active/passive voice issues
Lexical insertions and deletions
   Last week I went New York->Last week I went to New York
   I liked concert->I liked the concert
   Last week I went to shopping->Last week I went shopping
Lexical/phrasal substitutions
   I tried to search the missing part->I tried to find the missing part
   The dog bits the boy->The dog bit the boy
More complex mappings
   I have a lot of things to talk about->I have many things to discuss
   There are many people who have never . . . ->Many people have never Instead of mapping from one language to another, mapping is instead done from a so-called bad text to a so-called good text, wherein the bad and good texts are both in the same language. In some cases, the fundamentals of the bad and good texts may even be sound (e.g., no grammatical errors, spelling errors, etc.). The transition may simply be to shift from a first style in a first domain to a second style in a second domain.

Following is a list of example situations, not by limitation, in which the described writing assistance system can be applied to support a domain shift in style.
   Style shift—legal technical to legal non-technical
      The complaint was served->The lawsuit was initiated
      subpoena->order to appear in court
   Style shift—medical technical to medical non-technical
      hypertension->high blood pressure
   Style shift based on reading level
      Luke was confused by his options->Luke did not know what to do next In general the architecture underlying the writing assistance system, which will be described in detail below, is configured to support customization with different data sets. This, in turn, enables support for editing to account for grammar/style rewrites for native speakers, grammar/style rewrites for non-native speakers, house style rewrites, diction level rewrites (e.g., technical->informal), cross-dialectal rewrites (e.g., British English→United States English and vice versa), reading level rewrites, as well as others. Other alternatives should also be considered within the scope of the present invention. The approach is generally data driven in that the system is configured to acquire the basis for editing support directly from training data.

The actual editorial assistance can be provided to a user through any of a variety of interface mechanisms, several specific examples of which are described at other points in the present description. In some instances, one or more replacement candidates can be presented to a user for consideration and, ultimately, approval or selection. Alternatively, under appropriately constrained conditions, the writing assistance system may automatically replace a string of one or more words without review, approval or selection by the user.

It should be noted that the writing assistance system can be deployed within any application or input interface where correction of textual errors, particularly errors of a linguistic nature, may be desirable. Examples of suitable applications include, but are not limited to, any application designed for word or text processing, html editing, spreadsheet functionality, email functionality, or slide presentation functionality. The system could also be utilized in conjunction with, or as an adjunct to, existing grammar and/or style checking tools.

Generally speaking, the core architecture of the writing assistance system is designed in a manner analogous with that of traditional statistical machine translation systems, except that it provides translations from a first string of words to a second string of words within a generally monolingual environment. The first string may be undesirable in some manner while the second string is comparably well formed. The first string illustratively contains a grammatical error or stylistic infelicity that is remedied in the second string.

In the following notation, S(ource) means strings of words that are in some manner defective, such as by reason of grammatical error or stylistic infelicity. In contrast, T(arget) means corresponding strings of equivalent intended meaning that are well formed grammatically and/or stylistically felicitous. Generally speaking, the S strings and the T strings will be in the same language (Note: an exception is below wherein, in a non-native speaker scenario, there may be some bilingual overlap). The system is configured to find T*, which is the most probable T or ranked set of T's for each S that is provided as input, expressed formally as:

$$T* = \mathrm{argmax}(P(T \mid S)) \quad \text{Eq. 1}$$
$$= \mathrm{argmax}\left(\frac{P(S \mid T)P(T)}{P(S)}\right)$$
$$= \mathrm{argmax}(P(S \mid T)P(T))$$

It will be recognized by those skilled in the art that Eq. 1 represents an idealized case. Scaling and other re-weighting factors will ordinarily be introduced into the equation in order to balance the contributions of different components, as well as different properties and sizes of training data. These and any other modifications can be accounted for without departing from the scope of the present invention.

Figure 2:
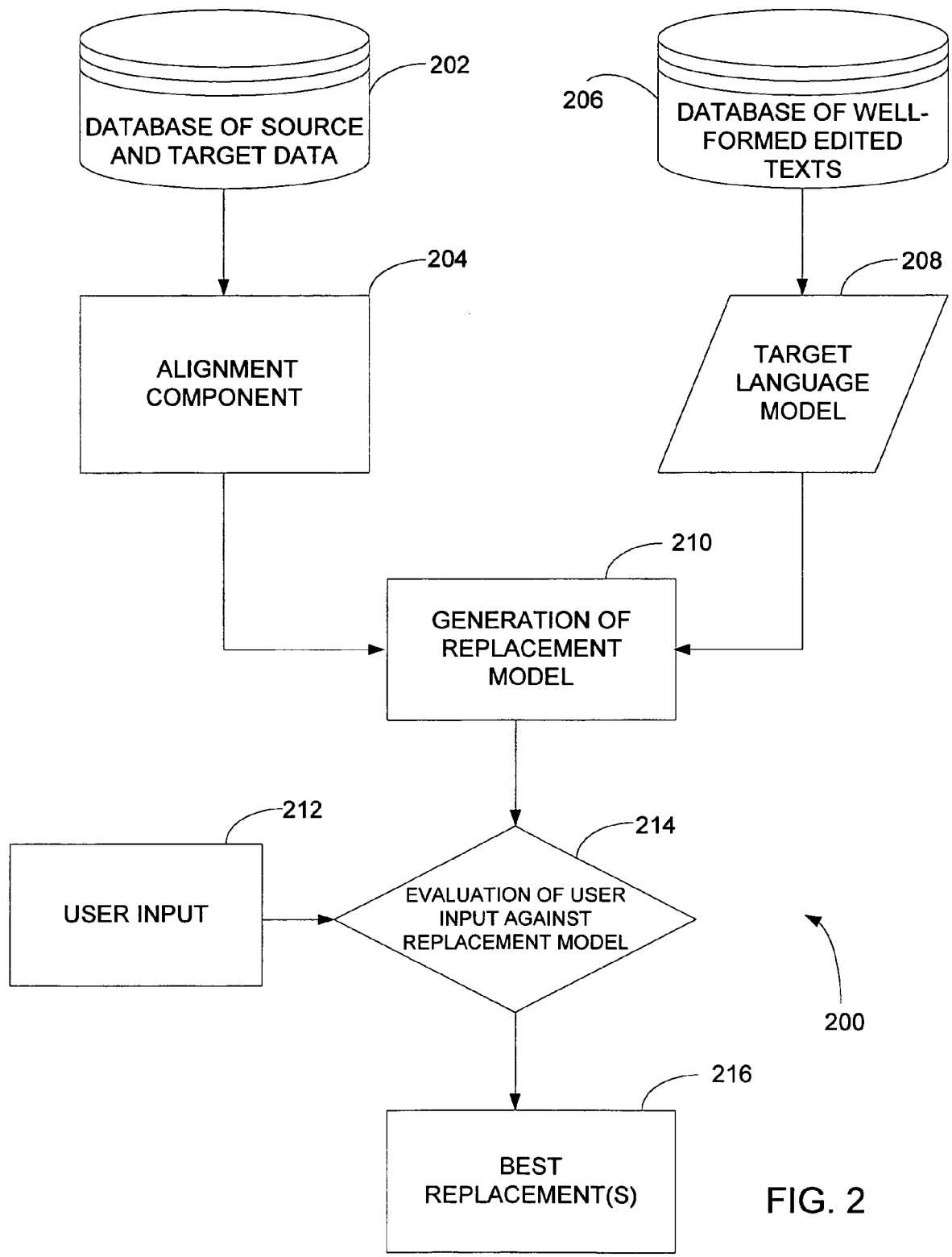
FIG. 2 is a schematic block diagram of one embodiment of the writing assistance system architecture.

FIG. 2 is a schematic block diagram of one embodiment of a writing assistance system architecture 200. Architecture 200 includes a database 202 containing source data and target data. Depending on the precise details of implementation, database 202 may contain defective (or stylistically undesirable) source sentences aligned with well-formed (or stylistically desirable) target sentences. Database 202 can be constructed in many different ways, for example, depending on the purpose or purposes to which the writing assistance system is to be applied, or based on the availability of certain types of data.

An alignment component 204, illustratively a statistical alignment component, is configured to operate upon the data contained in database 202. Those skilled in the art will appreciate that the statistical alignment conducted by component 204 could be string-based, structure-to-string based, or otherwise executed. The present invention is not limited to statistical alignment. Those skilled in the art will appreciate that Heuristic or hand alignments are also within the scope of the present invention. As is indicated by block 210, the results of the analysis of component 204 contribute to generation of a replacement model. The nature of the contribution will be described in greater detail below.

Architecture 200 also includes a database 206 containing well-formed (illustratively edited) text. A target language model 208 (e.g., an n-gram language model) is applied to the data in database 206 in order to generate data that, as is indicated by block 210, also contributes to generation of a replacement model. The nature of the contribution will be described in greater detail below.

A user provides input 212. As is indicated by block 214, the generated replacement model is utilized to conduct an evaluation of input 212. Based on that evaluation, one or more best replacements 216 are provided. It should be noted that architecture 200 is just one example of many ways that architecture can be configured to support the proposed system. Those skilled in the art will appreciate that other alternatives are certainly within the scope of the present invention.

The described architecture generally comprises at least two primary sub-components. The first sub-component is the alignment component, which can also be referred to as a translation model. The alignment component is configured to analyze the database of training data to identify mappings between source data and corresponding target data. The mappings are illustratively drawn between sets of data strings (words and phrases that may not necessarily correspond to syntactic units) and/or "snippets" of linguistic structure. This mapping function is conducted in order to build a model of errors or stylistic infelicities for which writing input is to be edited (e.g., indications of substitutions that are to be suggested or automatically made).

Matching strings or syntactic/semantic units in the pairs of corresponding data are illustratively mapped to each other in a manner analogous with that of source and target language in machine translation. Those skilled in the art of machine translation will appreciate that the mapping methods may be statistical or a based on a heuristic component. These and any other similar alternatives are to be considered within the scope of the present invention. That being said, statistical methods are likely to prove to be more robust and general, although non-statistical techniques may prove appropriate under limited circumstances, e.g., when targeting for some specific constructions, or for some limited domains. As in many known models of statistical machine translation, best practice commonly requires that the strings that are matched are phrases, consisting of strings of one or more words, which may or may not correspond to syntactic units of the kind identified by linguists.

It is also worth noting that the phrasal model may or may not incorporate additional information pertaining to syntax, i.e., relationships among the words of the phrases. The presence of such syntactic information on the source string, the target string, or on both strings permits more robust handling of long-range dependencies and relationships between words that are separated by other words. However, a model in which syntactic or semantic information is absent may suffice at least for the purposes of simple substitutions or transpositions of adjacent words.

The other above-mentioned primary sub-component can be generally referred to as a decoder component. The decoder sub-component is illustratively configured to take an input string consisting of words or phrases, and produce a corresponding lattice containing ranked candidate substitutions for incorrect or stylistically infelicitous segments of the string. In one embodiment, the ranked candidate substitutions are displayed to an end user, such as presentation through a drop-down mechanism or some other user interface device. Alternatively, the ranked candidate substitutions can be presented to an automated selection algorithm to support automated correction or replacement.

Ranking of the elements of the lattice is illustratively performed against a target language model constructed from a suitably large number of well-formed sentences (e.g., a database of sentences in the target language collected from a reliable source such as, but not limited to a reliable news agency). In one embodiment, an n-gram language model is utilized, with optional smoothing or back off at least to permit handling of unknown words. Of course, those skilled in the art will appreciate that any other types of language model can be utilized without departing from the scope of the present invention.

The training data incorporated into the above-described architecture illustratively falls into at least two broad groups. The first group includes data for systems intended for use by native speakers of the language in which editorial assistance is provided. The second group includes data for systems intended for use by non-native speakers of the language in which editorial assistance is provided.

Training data for native speaker models can originate from a variety of sources and may be formatted in a variety of different ways. Training data for native speaker models will typically be different from that used for training non-native speaker models.

Figure 3:
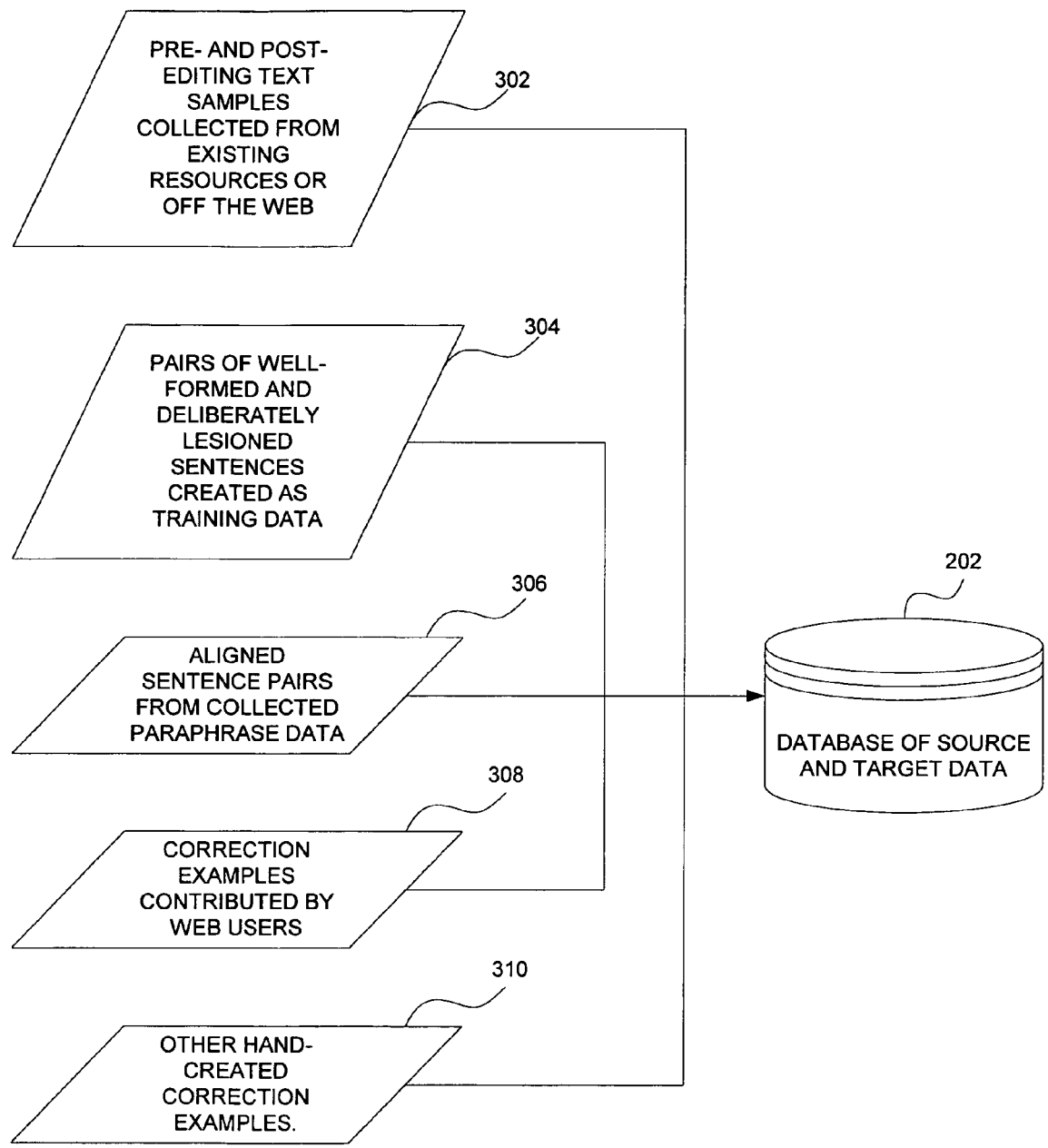
FIG. 3 is a schematic block diagram illustrating examples of native speaker data included in a database of source and target data.

FIG. 3 is a schematic block diagram illustrating examples of the type of native speaker data that can be included (i.e., included in database 202 shown in the architecture 200 of FIG. 2). Data 302 includes pre- and post-editing text samples collected from existing resources or off the Internet (e.g., off the World Wide Web). Data 304 includes pairs of well-formed and deliberately lesioned sentences created as training data. Data 306 includes aligned sentence pairs from collected paraphrase data. Data 308 includes correction examples contributed by web users. Data 310 includes other hand-created correction examples. The illustrated content of database 202 is, of course, intended to serve only as an example. Those skilled in the art will appreciate that the nature of the actual contents of database 202 will vary on an application-specific basis.

A few broad categories of training data for native speaker models, by further example and not by limitation, will now be provided.

a. The training data may include aligned text segment or sentence pairs consisting of pre-editing and post-edited text samples that contain actual errors encountered during editing processes and subsequent corrections.

b. The training data may include aligned text segment or sentence pairs consisting of pre-editing and post editing text, containing actual errors encountered during an editing process and their corrections that have been contributed to the database by members of a community of users that interact through a computer network, such as the Internet (e.g., through the World Wide Web).

c. The training data may include aligned text segment or sentence pairs consisting of well-formed and ill-formed entries that have been hand-created in order to address specific kinds of errors.

d. The training data may include pairs of well-formed text segments or sentences with corresponding versions of the same entries that have been lesioned to replicate typical errors. One way to do this is to intentionally add errors to a well-formed entry to replicate common error patterns. Another useful method is to take data, such as that used in a, b, or c, and use it to train an "inverted" version of the present system to generate large quantities of text containing the error patterns.

e. The training data may include aligned text segment or sentence pairs consisting of well-formed entries and corresponding well-formed entries that say the same thing in a different style that represents a readability shift (e.g., one entry is technical and the corresponding entry essentially says the same thing in a less technical manner—one version is full of legalese and the other version is more understandable by non-lawyers).

It will be recognized by those with expertise in editing and writing assistance tools that a database of aligned pairs used for training the system could contain all of the above or some combination thereof. Similar data from any other source, and in any other format, could also or alternatively be utilized. The most appropriate data will depend at least upon the competence of the targeted user, the extent of the features of the targeted application, the extent of resources that are available to build the database. Other factors that also might come into play are constraints such as memory resources on machines, or whether the writing assistance application is located on the user's local machine or on a server.

Training data for non-native speaker models can also originate from a variety of sources and also may be formatted in a variety of different ways. Training data for non-native speaker models will typically be different from that used for training native speaker models.

Figure 4:
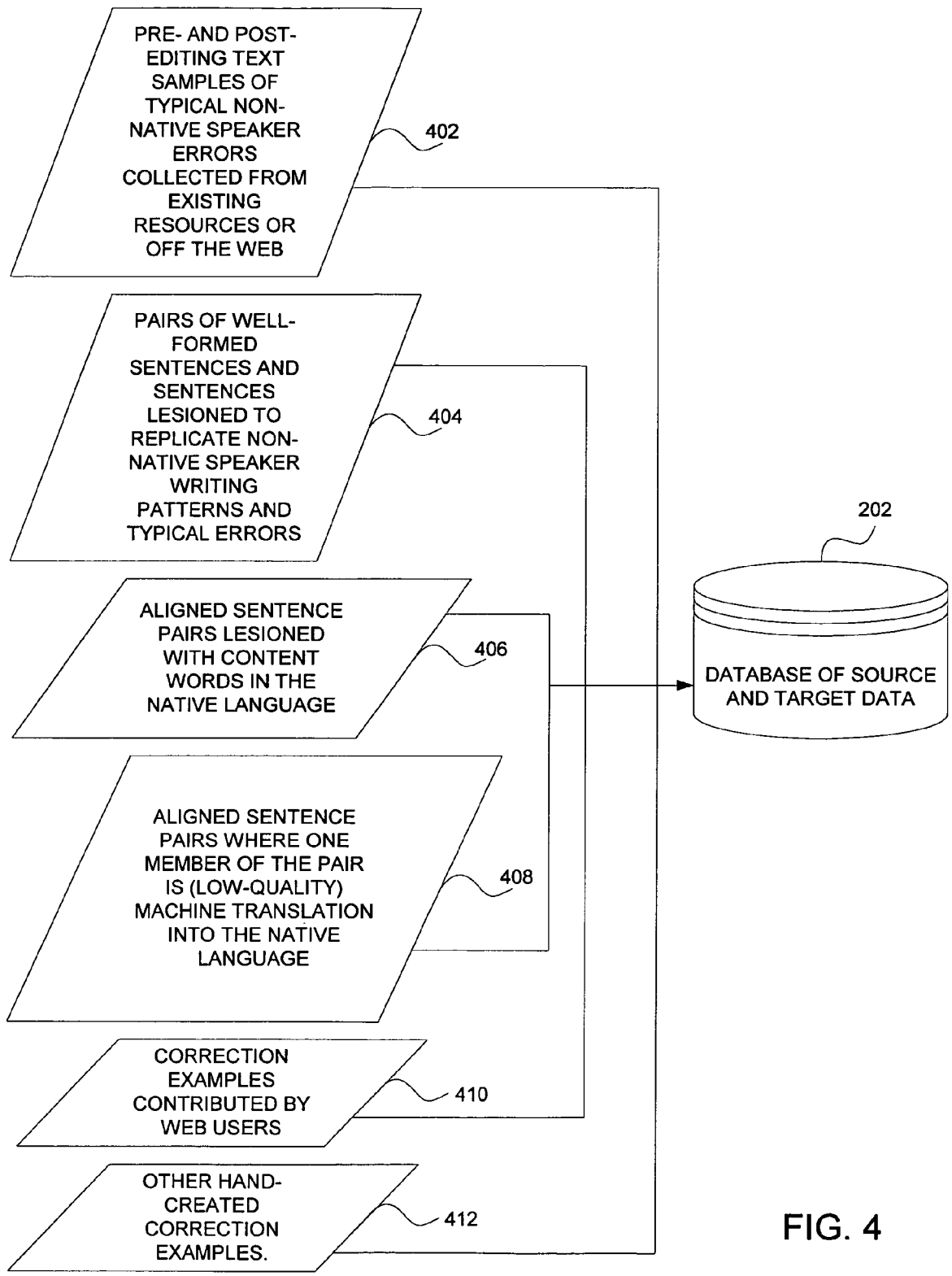
FIG. 4 is a schematic block diagram illustrating examples of non-native speaker data included in a database of source and target data.

FIG. 4 is a schematic block diagram illustrating examples of the type of non-native speaker data that can be included (i.e., included in database 202 shown in the architecture 200 of FIG. 2). Data 402 includes pre- and post-editing text samples of typical non-native speaker errors collected from existing resources or off the Internet (e.g., off the World Wide Web). Data 404 includes pairs of well-formed sentences and sentences lesioned to replicate non-native speaker writing patterns and typical errors. Data 406 includes aligned sentence pairs lesioned with content words in the native language. Data 408 includes aligned sentence pairs where one member of the pair is (low-quality) machine translation into the native language. Data 410 includes correction examples contributed by users of the World Wide Web or some other computer network interface. Data 412 includes other hand-created correction examples. The illustrated content of database 202 is, of course, intended to serve only as an example. Those skilled in the art will appreciate that the nature of the actual contents of database 202 will vary on an application-specific basis.

A few broad categories of training data for non-native speaker models, by further example and not by limitation, will now be provided.

a. The training data may include aligned text segment or sentence pairs consisting of pre-editing and post-edited text, representing actual non-native speaker errors that are relatively typical of non-native speakers of the target language, irrespective of their native language.

b. The training data may include aligned text segment or sentence pairs consisting of pre-editing and post-edited text, representing actual non-native speaker errors by native speakers of a specific language, or a group of structurally or lexically similar languages. For example, the errors made by Japanese speakers writing English will typically differ from those of Spanish speakers but are known to share many properties with the errors made by Korean speakers writing in English.

c. The training might include aligned text segment or sentence pairs consisting of well-formed entries and corresponding ill-formed entries exhibiting errors typical of non-native speakers that have been contributed to the database by members of a community of users that interact through a computer network, such as the Internet (e.g., through the World Wide Web). This may be especially appropriate where the users are speakers of a smaller language where the quantity of error data available for training may be quite limited.

d. The training data may include aligned text segment or sentence pairs consisting of well-formed entries and corresponding ill-formed entries that have been hand-created in order to address specific kinds of errors that may be especially problematic in a given domain, for example, mechanics of business letter writing.

e. The training data may include pairs of well-formed text segments or sentences with versions of the same text segments or sentences that have been lesioned to replicate non-native speaker writing patterns and/or typical errors. One way to do this is to intentionally add errors to a well-formed entry to replicate common error patterns. In another example, useful data can be created by taking data, such as that used in a, b, c, or d, and using it to train an "inverted" version of the present system to generate large quantities of text containing non-native error patterns.

f. The training data may include aligned segment or sentence pairs consisting of well-formed entries and versions of the same that have been produced from parallel corpora by machine translation from the native language of the user into the target language.

g. The training data may include aligned text segment or sentence pairs consisting of well-formed entries and versions of the same that have been produced by machine translation from the native language of the user into the target language, as in f but created indirectly by using the output of the machine translation, either independently, or together with other data in a-f, to train an "inverted" version of the present system to develop lesioned data.

h. The training data may include aligned text segment or sentence pairs consisting of well-formed entries and versions of the same that have been lesioned by replacing content words in the target language with content words taken from the native language of the user. This allows, for example, a Japanese or Chinese person writing in English, to type some words in his or her native language, and to enable the system to find appropriate replacements, for example based on the context in which the English word appears. By including such data directly into the training data, it is possible to integrate bilingual lookup directly into the editing assistant, without requiring a separate mechanism to handle lookup.

i. The training data may include parallel aligned sentence or text segment pairs consisting of well-formed target-language entries and their translation counterparts in the native language of the user. training on data of this kind permits non-native speakers to engage in target language writing at varying levels of competence, ranging from near-monolingual reliance on the bilingual machine translation to occasional resort to native-language words and phrases in order to resolve gaps in knowledge of the target language.

It will be recognized by those with expertise in editing and writing assistance tools that a database of aligned pairs used for training the system could contain all of the above or some combination thereof. Similar data from any other source, and in any other format, could also or alternatively be utilized. The most appropriate data will depend at least upon the competence of the targeted user, the extent of the features of the targeted application (e.g., is a translation/glossing component to be included?), the extent of resources that are available to build the database, and other constraints such as memory resources on machines, or whether the writing assistance application is located on the user's local machine or on a server. In addition, the replacement model might be configured to incorporate elements of the native-speaker model, for example, a paraphrase model.

For language pairs in which large quantities of naturally-occurring, non-native error data is available and sufficient for training, it may be preferable to utilize that data only. However, where more limited data is available, incorporation of artificially created data by inverting the editing model in order to translate well-formed target language sentences into their lesioned counterparts offers a means of rapidly constructing data sets upon which the editing model can be trained.

Figure 5:
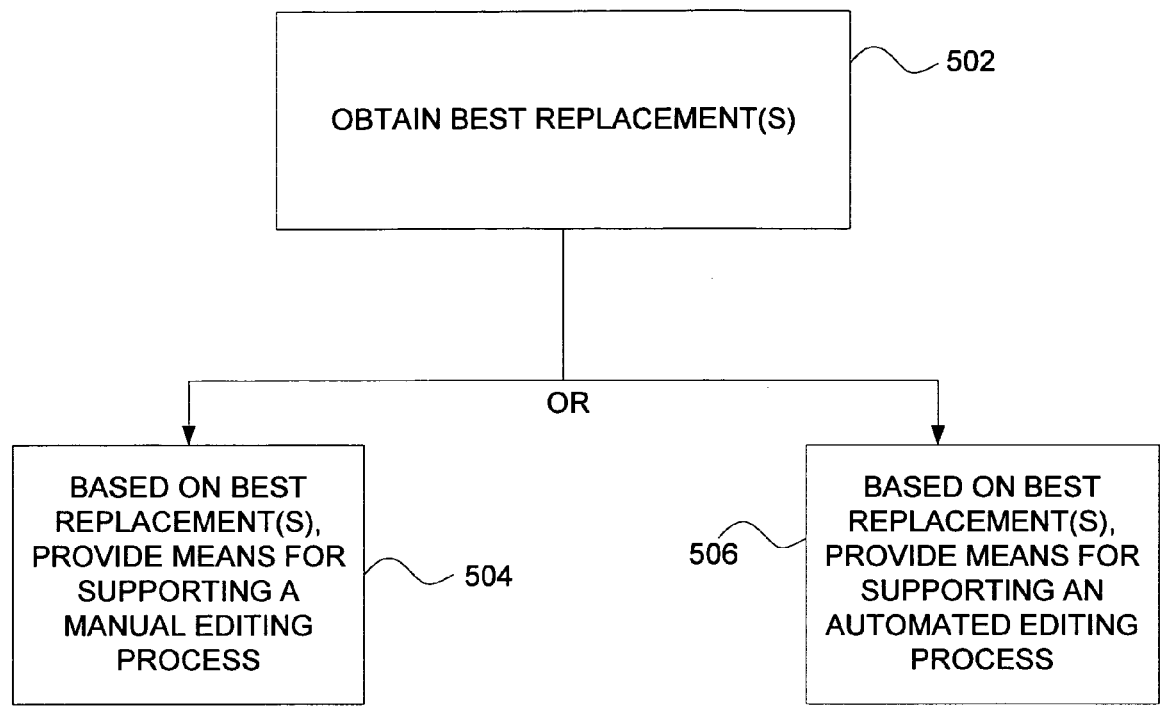
FIG. 5 is a block flow diagram illustrating steps associated with supporting an editing process.

The writing assistance system can be configured to support any of a wide range of user interfaces and user interface scenarios. FIG. 5 is a block flow chart illustrating basic steps associated with providing writing assistance within the described system framework. In accordance with block 502, one or more best replacements are obtained. In accordance with block 504, based on the best replacement(s), a manual editing process is supported. In accordance with block 506, based on the best replacement(s), an automated editing process is supported.

In one implementation, the lattice representation created in the decoder can be readily displayed to the user thereby enabling the user to access a collection of high-probability rewrites for strings of words that are determined by the language model to be deviant, defective or otherwise in need of substitution.

In another implementation, the system automatically detects user input text that diverges from the target language model and flags it with, for example, a colored squiggle or other underline, or some form of automated text highlighting that attracts the user's attention, and demarcates the maximal span on the string of the corrections being offered. Upon clicking on the flagged string, the user is presented with a dropdown menu or other display mechanism that presents the best solution as determined by the system or, alternatively, several top-ranked solutions generated by the system. The user is then able to select or reject the solution presented, or, in the case of multiple solutions, select from among the solutions.

In another implementation, the user highlights a segment of text about which he or she wishes to review suggestions produced by the system. In this instance, the user selects the string of interest, and the best solution, or a set of top-ranked solutions, is presented to the user in the form of a dropdown or other display. The user is then able to reject the solutions offered, accept a solution, or expand or contract the length of the string being queried to see further suggested replacements. This "silent" mode of operation can be highly-resource efficient, since the system need only be invoked with respect to the string being queried, and perhaps several words to the left and right.

For the purposes of exemplification above, it was assumed that the user is presented as the original author of the document. However, the user might be another author or post-editor who queries the system for suggested corrections on a document that has been written by someone else. For example, a co-author might receive a document written in English by a non-native speaking colleague using a different word processing application that lacked, for example, non-native editing assistance. The co-author can illustratively perform a first pass edit of the document using the non-native writing assistance model, and then a second pass edit using the native speaker model to achieve further refinements.

In another implementation, the text is automatically modified by the system without consulting the user. In one variant of this implementation, the text is changed silently without notification to the user. In another variant, replacements introduced by the writing assistance system are flagged as editorial changes, so that they may be individually recognized as such and accepted, rejected or modified by a human user, in the manner analogous with that commonly used in the collective writing and editing of electronic documents by humans.

In another implementation, the user edits the text using one of the above techniques, or makes independent editorial changes that he or she determines are stylistic or grammatical rather than having to do with content. In this implementation, the changes are recorded in a cache so that the corresponding input string can be flagged when it is encountered the next time. At the end of a suitable period of time, the user is given the option of discarding the cache, saving the cache, or incorporating the contents of the cache into the replacement model used by the writing assistance system, in which case, the replacement model is rebuilt and re-weighted automatically to incorporate the example sentence pairs held in the cache. In one exemplary implementation, the rebuilt model incorporates data from the caches of several authors or editors, who could then use the new-updated model in their own systems. This implementation would be particularly appropriate in situations in which a team of writers or editors is required to conform to a house style. Implementation over a reasonable period of time would then permit the house style to be become reflected in the system replacement model.

In another implementation, the writing assistance system is applied to the output of a speech to text engine. In one embodiment, the writing assistance system provides the user with substitutions intended to remedy those errors introduced by the speech recognition engine and also any errors or stylistic infelicities that the user has introduced independently of the speech engine. For example, spoken input to speech recognition may exhibit many of the characteristics of speech, including false starts and errors of grammar and style that would not be made in careful writing. The writing assistance system detects these errors and offers corrections in form of a lattice. In one implementation of this, the writing assistance system learns the difference between the original input and the corrected forms using the updating technique previously described.

In still another implementation, the writing assistance system is used to generate data with which to train students for standardized achievement tests and for other educational purposes. In this implementation, texts are scanned for common classes of errors, and the system is used to provide rewrites that can be used to construct answers in multiple choice tests. Here, the writing assistance system is able to verify that not only is the proposed correct answer accurate, but also that the incorrect answers are inaccurate.

The illustrative scenarios above by no means limit or exhaust the possible manners in which the writing assistance system might be applied. It will be evident to anyone who has ever engaged in writing or editing that there are many further scenarios and combinations of scenarios in which the system might find application.

There is a broad range of advantages associated with the described writing assistance system. A first advantage is a relatively low cost for development and maintenance. For example, utilizing statistical machine translation techniques as a basis for analysis eliminates reliance on any specification of rules that need to be handcrafted and maintained by expert rule writers. Maintenance can be performed simply by obtaining new data in the form of examples of errors or infelicities with their corrected analogs, which may be derived from a variety of sources (examples of sources are described below in detail). An error correction model is then generated based on the new data.

Another advantage is that the system is configured to always support at least one candidate rewrite, thus the user is never stranded without a suggestion. Further, because the system shares processing components with statistical machine translation systems, as machine translation algorithms improve, so will the potential for quality of writing assistance.

Another advantage is non-language specificity. For example, because the writing assistance system does not rely on the writing of hand-crafted grammar or style rules, its architecture can be of a very general form that permits application to any language. To accommodate a new language, an error correction model for the language for which editorial assistance is sought is trained based on the statistical machine translation architecture. This new error correction model is then employed by the writing assistance system.

Another advantage is a potential for automatic customization to specific user groups or styles. For example, because the writing assistance system does not rely on the writing of hand-crafted grammar or style rules, its architecture can be of a very general form that permits accommodation of models tailored to the characteristics of particular user groups, or styles of writing associated with specific technical domains, publications, or organizations (e.g., house styles). In this case, the error correction model is trained based on the statistical machine translation architecture to reflect the error characteristics of the user groups or the writing styles associated with the domain, publication or organization concerned.

Another advantage is an identical architecture for native and non-native users. For example, because the writing assistance system does not rely on the writing of hand-crafted grammar or style rules, its architecture can be of a very general form that permits accommodation of models tailored to the characteristic patterns of errors made by non-native-speaking users as well as those made by native-speaking users. In this case, an error correction model can be trained based on the statistical machine translation architecture to reflect the error characteristics of non-native speakers of the language or languages in which proofing capability is sought. In some implementations, the system can be configured to switch back and forth between native speaker and non-native speaker models. Similarly, different models for speakers of different native languages can be present on the same machine, and can be configured for a switching on and off as desired.

Still another advantage is a relative simplification of maintenance tasks from the perspective of the user community. For example, because the statistical machine translation model does not rely on construction of grammar or style rules, training data for the writing assistance system can be readily maintained by untrained user communities, who contribute example pairs of sentences containing grammatical or stylistic errors and sentences containing corresponding corrections. At most, all that may be required is an editor who can coordinate the collection of data and verify its validity. This approach is particularly useful in the case of languages spoken by smaller populations (for example, Navajo, New Zealand Maori, Icelandic, etc.) where large data sets of corrected sentences may not be readily available, but where members of that speech community might be willing to contribute their time and effort towards the goal of making grammar and style checking available.

Those skilled in the art will appreciate that, within the framework of many known text-generation systems, it is relatively common for a user to independently edit text, as well as to accept suggested changes. In one embodiment, the well-formed and ill-formed data associated with such changes and edits are utilized as training data within the described writing assistance framework. Thus, the system is configured to train based on the end user's own correction patterns and/or patterns of accepting suggested changes.

In one embodiment, a user is allowed to selectively adjust to get fewer or more corrections, ranging from those that the system has the highest confidence about, to those which it has less confidence. This feature can be made available regardless of the source of the training data. In one embodiment, the user makes adjustments through a user interface having an appearance of a knob, a slider, or some other similar mechanism.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for providing writing assistance to a user, the method comprising:
   automatically generating a mapping between two strings of text that are in a same language, wherein automatically generating comprises automated generation by a computing device based on statistical or heuristic analysis of the two strings of text relative to a collection of training data, wherein each of the two strings of text is a phrase consisting of more than one word, and wherein analysis of the two strings of text comprises analysis of the two strings of text relative to a collection of native speaker data, the collection of native speaker data comprising pre- and post-editing text samples, pairs of well-formed and deliberately lesioned sentences, aligned sentence pairs collected from paraphrase data, and hand-created correction examples;
   providing, based at least in part on the mapping, an indication of a style transformation that could be applied to modify at least a portion of input received from the user, wherein the input received from the user comprises words that are completely in the same language as the two strings of text;
   wherein providing an indication of a style transformation comprises providing a list of suggested substitutions that each represent a potential shift from a first style in a first domain to a second style in a second domain;
   wherein providing a list comprises providing a list ranked so as to reflect analysis relative to a language model trained based on a collection of well-formed data;
   wherein each of the suggested substitutions comprises a string of words that is presented completely in the same language as the two strings of text and as the input received from the user; and
   wherein providing an indication of a style transformation comprises evaluating at least one candidate style transformation relative to a target language model.

2. The method of claim 1, wherein automatically generating a mapping between two strings of text comprises automatically generating a mapping between a first string of text and a second string of text, wherein one of the first and second strings is in a technical domain and the other is in a non-technical domain, and wherein providing an indication of a style transformation comprises utilizing the mapping as a basis for analyzing content of the input received from the user and providing an indication of at least one substitution that can be applied to transform at least a portion of the input.

3. The method of claim 1, further comprising:
building a model of the style transformation based at least in part on the mapping;
automatically detecting the user input based at least in part on the user input diverging from the target language model; and
automatically highlighting the user input.

4. The method of claim 1, wherein providing an indication of a style transformation comprises automatically applying a modification so as to transform at least a portion of the input and wherein automatically applying the modification comprises replacing without the user's review, approval, or selection.

5. The method of claim 4, further comprising:
flagging the automatically applied modification as an editorial change.

6. The method of claim 4, wherein the user is not notified of the automatically applied modification.

7. The method of claim 1, wherein providing a list comprises providing a list to the user so as to support a user selection process, wherein automatically generating a mapping between two strings of text comprises automatically generating a mapping between a first string of text and a second string of text, wherein one of the first and second strings is in one dialect of a language and the other is in another dialect of the same language, and wherein evaluating said at least one candidate style transformation comprises evaluating relative to a target language model trained to reflect a collection of well-formed data.

8. The method of claim 1, wherein providing a list comprises providing as input to an automated selection algorithm, and wherein providing an indication of a style transformation comprises providing an indication of a transposition of adjacent words.

9. The method of claim 1, further comprising:
the user highlighting a segment of text to form the user input; and
wherein providing an indication comprises providing the indication in response to the user's highlighting.

10. The method of claim 9, further comprising:
the user expanding the segment of text to view further suggested replacements.

11. The method of claim 9, further comprising:
the user contracting the segment of text to view further suggested replacements.

12. A computer-implemented writing assistance system comprising:
an alignment component that automatically generates a model of a style transformation based on a comparison of two strings of text that are in a same language, each of the two strings of text being a phrase comprising more than one word, wherein automatically generating comprises automated generation by a computing processor based on statistical or heuristic analysis of the two strings of text relative to a collection of training data also in the same language, wherein automatically generating comprises automatically generating without processing text in a language other than the same language as the two strings of text, wherein automatically generating comprises automatically generating based on a statistical or heuristic alignment of the two strings, said statistical or heuristic alignment being alignment of more than one word phrases, and wherein the analysis of the two string of text relative to the collection of training data comprises analysis of the two strings of text relative to a collection of non-native speaker data, the collection of non-native speaker data comprising pre- and post-editing text samples of typical non-native speaker errors, pairs of well-formed sentences and sentences deliberately lesioned sentences to replicate non-native speaker patterns, aligned sentence pairs lesioned with content words in the native language, and aligned sentence pairs where one member of the pair is low-quality machine translation; and
a decoder component configured to process an input string that includes words or phrases and to generate, based at least in part on information received from the alignment component, a list of proposed substitutions that potentially could be applied to transform the style of at least a portion of the input string into a well-formed string, wherein the list of proposed substitutions comprises a list ranked so as to reflect analysis relative to a language model trained based on a collection of well-formed data.

13. The system of claim 12, wherein the decoder component is further configured to switch between native speaker and non-native speaker models.

14. The system of claim 13, wherein automated generation by a computing processor based on statistical or heuristic analysis comprises utilizing an n-gram language model with optional smoothing.

15. A computer-implemented method for providing writing assistance to a user, the method comprising providing writing assistance, using a processor, based on an automated statistical comparison of a collection of source texts reflecting a first style in a first domain relative to associated target texts reflecting a second style in a second domain, the source texts being in a same language as the target texts, wherein the automated statistical comparison is a monolingual process in that only data in the same language is processed without reference to any corresponding data in a different language, wherein the automated statistical comparison includes a statistical alignment of phrases in the same language, each of the phrases comprising more than one word, wherein the source texts and the target texts contain no grammatical or spelling errors, and wherein the automated statistical comparison of the source texts and the target texts comprises analysis of the source texts and the target texts relative to a collection of non-native speaker data, the collection of non-native speaker data comprising pre- and post-editing text samples of typical non-native speaker errors, pairs of well-formed sentences and sentences deliberately lesioned sentences to replicate non-native speaker patterns, aligned sentence pairs lesioned with content words in the native language, and aligned sentence pairs where one member of the pair is low-quality machine translation.

16. The method of claim 15, wherein providing writing assistance based on a comparison comprises providing writing assistance based on a comparison of texts received through a computer network from a community of users, and wherein the source texts are in a technical domain and the target texts are in a non-technical domain.

17. The method of claim 15, wherein providing writing assistance further comprises switching between native speaker and non-native speaker models.

18. The method of claim 17, further comprising:
utilizing a processor that is a functional component of the computer to apply the writing assistance to an output of a speech to text engine.

* * * * *